United States Patent
Wolf et al.

(10) Patent No.: US 11,416,981 B2
(45) Date of Patent: Aug. 16, 2022

(54) METHOD AND SYSTEM FOR DETECTING DAMAGE TO A COMPONENT

(71) Applicant: ZF Friedrichshafen AG, Friedrichshafen (DE)

(72) Inventors: Daniel Wolf, Friedrichshafen (DE); Johannes Schaefer, Friedrichshafen (DE); Jochen Abhau, Bregenz (AT)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 40 days.

(21) Appl. No.: 16/772,166

(22) PCT Filed: Nov. 20, 2018

(86) PCT No.: PCT/EP2018/081988
§ 371 (c)(1),
(2) Date: Jun. 12, 2020

(87) PCT Pub. No.: WO2019/115183
PCT Pub. Date: Jun. 20, 2019

(65) Prior Publication Data
US 2021/0073962 A1    Mar. 11, 2021

(30) Foreign Application Priority Data

Dec. 15, 2017    (DE) .................. 10 2017 222 964.0

(51) Int. Cl.
*G06K 9/00*    (2022.01)
*G06T 7/00*    (2017.01)
(Continued)

(52) U.S. Cl.
CPC .......... *G06T 7/001* (2013.01); *G01M 13/021* (2013.01); *F03D 15/00* (2016.05); *F03D 17/00* (2016.05);
(Continued)

(58) Field of Classification Search
CPC .......... G06T 7/001; G06T 2207/20081; G06T 2207/30164; G01M 13/021;
(Continued)

(56) References Cited

U.S. PATENT DOCUMENTS

| 6,259,960 B1* | 7/2001 | Inokuchi | G01N 21/9501 |
| | | | 700/109 |
| 2008/0247636 A1* | 10/2008 | Davis | G09G 5/00 |
| | | | 382/152 |

(Continued)

FOREIGN PATENT DOCUMENTS

EP    2921840 A1    9/2015
WO    WO 2017196821 A1    11/2017

OTHER PUBLICATIONS

Alfred Iwainsky, "Lexikon der Computergrafik und Bildverarbeitung", Vieweg, Dec. 1994, pp. 27-28.

(Continued)

*Primary Examiner* — Samir A Ahmed
(74) *Attorney, Agent, or Firm* — Leydig, Voit & Mayer, Ltd.

(57) ABSTRACT

A method for detecting damage and determining a type of damage and a degree or severity of damage to a component of a transmission. The method includes providing a first image of a portion of the component in a reference state and detecting a further image of the portion of the component after intended use. The further image of the portion of the component is detected in an installed state of the component. The method further includes determining, by comparing the further image with the first image, that the component is damaged, determining, by matching the further image against data of a damage database, a type of damage, and outputting the determined type of damage and a degree or (Continued)

severity of damage. The first image, the further image, and the data of the damage database are photographs.

13 Claims, 3 Drawing Sheets

(51) Int. Cl.
*G01M 13/021* (2019.01)
*F03D 15/00* (2016.01)
*F03D 17/00* (2016.01)

(52) U.S. Cl.
CPC ............... *G06T 2207/20081* (2013.01); *G06T 2207/30164* (2013.01)

(58) Field of Classification Search
CPC ...... G01M 5/0091; F03D 15/00; F03D 17/00; G06K 9/6269; G06K 9/6273; G06K 2209/19; G06K 9/6202; G06V 10/751; G06V 10/82; G06V 2201/06
See application file for complete search history.

(56) References Cited

U.S. PATENT DOCUMENTS

| | | |
|---|---|---|
| 2009/0309762 A1 | 12/2009 | Woelcken et al. |
| 2011/0020122 A1* | 1/2011 | Parthasarathy ......... F03D 17/00 416/61 |
| 2013/0058560 A1* | 3/2013 | Sobczak ................... G06T 7/12 382/152 |
| 2013/0082857 A1* | 4/2013 | Beer ...................... G01S 13/885 342/22 |
| 2013/0114878 A1* | 5/2013 | Scheid .................... G06T 7/001 382/141 |
| 2014/0105481 A1* | 4/2014 | Hasselbusch ......... G06T 7/0006 382/141 |
| 2016/0041070 A1* | 2/2016 | Wascat .................. G05B 23/024 702/183 |
| 2017/0069070 A1 | 3/2017 | Seely et al. |
| 2017/0122837 A1* | 5/2017 | Mtauweg ............ G01M 13/021 |
| 2017/0178308 A1 | 6/2017 | Subramaniyan et al. |
| 2017/0219495 A1* | 8/2017 | Nagata ............. G01N 21/95684 |
| 2017/0220718 A1 | 8/2017 | Freeman et al. |
| 2017/0267460 A1* | 9/2017 | Buchwald .............. G01N 21/94 |
| 2017/0323240 A1* | 11/2017 | Johnson ............. G06Q 10/1093 |
| 2017/0323274 A1* | 11/2017 | Johnson ............. G05B 23/0251 |
| 2017/0352199 A1* | 12/2017 | Finley ........................ G06T 7/13 |
| 2018/0101956 A1* | 4/2018 | Elkins ..................... G06T 7/001 |
| 2018/0335018 A1* | 11/2018 | Cao .......................... F03D 7/046 |
| 2019/0063903 A1* | 2/2019 | Dou ......................... G01B 7/107 |
| 2019/0139211 A1* | 5/2019 | Morawitz ............... G06T 7/001 |
| 2019/0145183 A1* | 5/2019 | Potash .................... G06T 7/001 700/175 |
| 2020/0133182 A1* | 4/2020 | Haik ................... H04N 1/40068 |
| 2021/0174486 A1* | 6/2021 | Chowhan ............. G06T 7/0002 |

OTHER PUBLICATIONS

Alfred Nischwitz, et al., "Computergrafik und Bildverarbeitung", vol. 2, Vieweg+Teubner Publishers, Dec. 2011, pp. 341-354.

* cited by examiner

METHOD AND SYSTEM FOR DETECTING DAMAGE TO A COMPONENT

CROSS REFERENCE TO RELATED APPLICATIONS

This application is a U.S. National Stage Application under 35 U.S.C. § 371 of International Application No. PCT/EP2018/081988 filed on Nov. 20, 2018, and claims benefit to German Patent Application No. DE 10 2017 222 964.0 filed on Dec. 15, 2017. The International Application was published in German on Jun. 20, 2019 as WO 2019/0115183 A2 under PCT Article 21(2).

FIELD

The present invention relates to a method and a system for detecting damage to a component, and in particular, to a method and a system for detecting damage to a component that include comparing an image of the component in a reference state to an image of the component after its intended use.

BACKGROUND

Nowadays, inspections of components are usually carried out on site by an expert. This is time-consuming and expensive particularly in the case of stationary systems, such as wind turbines, or larger mobile machines, such as ships, excavators, dumpers or the like. In addition, high consequential costs may arise when damage develops rapidly and occurs between two inspection intervals.

EP 2 921 840 A1 relates to a test unit and a method for the quantitative analysis of a contact pattern of a gear, where images of the gear are compared with each other at different points in time.

SUMMARY

In an embodiment, the present invention provides a method for detecting damage and determining a type of damage and a degree or severity of damage to a component of a transmission. The method includes providing a first image of a portion of the component in a reference state and detecting a further image of the portion of the component after intended use. The further image of the portion of the component is detected in an installed state of the component. The method further includes determining, by comparing the further image with the first image that the component is damaged, determining, by matching the further image against data of a damage database, a type of damage, and outputting the determined type of damage and a degree or severity of damage. The first image, the further image, and the data of the damage database are photographs.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
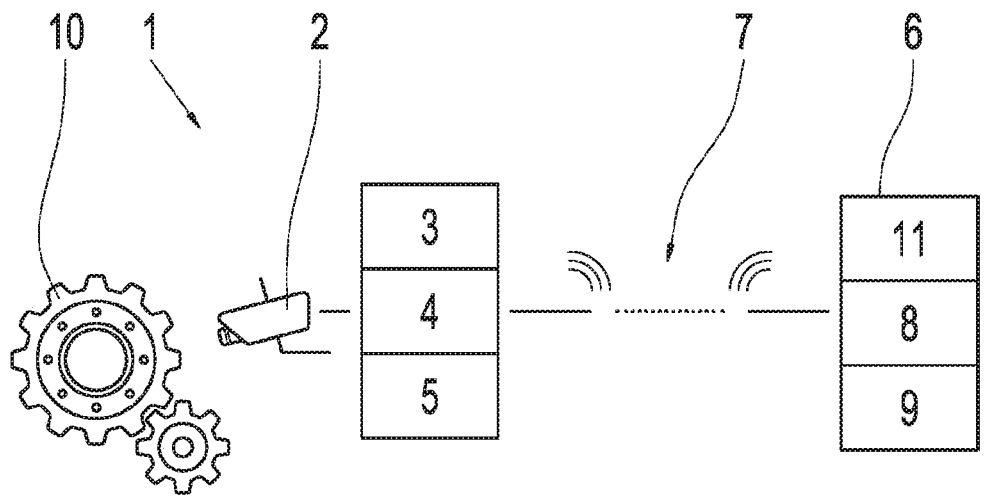
FIG. 1 shows a system for detecting damage to a component according to an embodiment.

According to the present disclosure, a method for detecting damage to a component comprises providing a first image of a portion of the component in a reference state. The component may be a gear of a transmission, a bearing, a turbine blade, a shift fork, an actuator, a cylinder, a power transmission screw, or the like. For example, the component is part of a wind turbine, an aircraft, an automobile or some other technical equipment. In technical equipment, the component has in particular a technical function which can lead to component damage in the course of unidirectional operation. Damage to the component may include material fatigue, i.e. a slowly progressing degradation process, and/or force damage, i.e. damage due to static short-term stress and/or some other form of damage. The portion of the component may be, for example, a surface which serves for power transmission.

A group of a plurality of components, for example a gear and an adjoining housing, may be shown in the first image. Alternatively, only a single component or only a portion of a single component may be depicted in the first image.

The reference state may be a state before shipping, before installation and/or before the intended commissioning of the component. In particular, the component may be free from damage, or may have damage to a tolerated degree, in the reference state. It is possible, in particular, to take the first image in the reference state as part of an end-of-line (EOL) inspection and thus immediately after the manufacture and assembly of the component. However, the first image in the reference state can be taken also during commissioning, for example after completed installation of a wind turbine.

The method also comprises detecting a further image of the portion of the component after its intended use. In particular, the further image can be taken at a point in time when the component is to be checked for the presence of damage, for example at the time of a scheduled inspection. Furthermore, further images of the component can be taken at cyclically recurring intervals and/or when it suits the operating scheme. Intended use of the component means the use for a function for which it has been constructed and/or designed.

The method further comprises comparing the further image with the first image to determine whether the component is damaged. When comparing the images, it is possible to search the images for differences and/or commonalities. The comparison may be computer-assisted, i.e. by an electronic data processing device such as a microcontroller. The images to be compared may be present in digital form for comparison. During the assessment, it can be examined whether the images exceed a certain threshold of differences and the component thus be regarded as damaged. This threshold may be variable.

If a damage is detected when comparing the first and the further image, in a subsequent step the further image will be compared with data in a damage database in order to determine the type of damage. The damage database may be categorized by damage type and include any number of different damage data, in particular as regards their different manifestations and seventies. The data in the damage database are, in particular, opto-electronic data of different types of damage. The damage database may include, for example, images, for example images of pitting, tooth breakage, micro-pitting, corrosion and/or wear of a gear, in particular, in different manifestations. The damage database may be a digital data record.

Furthermore, the damage database may include metadata. Metadata may be: Transmission type, application, component type, type of fault, severity, data regarding location, etc. The metadata can be used in parallel with the method to cover different applications, e.g. wind power and marine. The damage database can thus contain application-specific and cross-application data records.

In addition, the method comprises outputting the type of damage that was determined by comparing the further image with the data in the damage database. The output of the type of damage is of a technical nature because it can prevent further damage or even destruction of the component and thus potential injury to persons nearby. The output can take place in the form of a digital and/or analog report and/or via a display device.

The method may be performed locally, centrally, and/or in a distributed manner.

The method makes it possible to detect in a simple manner and with high accuracy the type of damage to a component. Thanks to the two-stage method approach, only images in which damage to the component was previously detected are matched against the damage database. The preceding comparison step enables a precise preselection to be made of images to be subjected to the more complex and error-prone matching method for determining the type of damage. The two-stage approach thus results in high accuracy in the detection and diagnosis of damage to a component.

The first image, the further image and the data in the damage database may be photographs, in particular digital photographs. Alternatively, however, the images may also be other data recorded with a sensor for electromagnetic waves, for example radio waves, microwaves, radar, UV light, IR light, visible light and/or gamma radiation.

Comparison of the first image with the further image may be made by means of a correlation analysis. In particular, the gray and/or color values of the respective images can be correlated with each other. This makes possible a simple and efficient comparison of high accuracy. To increase accuracy, the correlation analysis can be performed with illumination normalization. This means that the illumination intensity present in the images to be compared is computationally eliminated during the correlation.

In addition, matching the further image against the data in the damage database may comprise a feature detection and matching method. Characteristic features in the images to be matched are detected by means of this method (feature detection). The characteristic features may be, for example, regions of the images with high gradients in a signal amplitude. For example, high gradients in the color and/or gray values may be characteristic features in photographs. Accordingly, characteristic features may be, for example, edges. Feature detection may be carried out by means of SURF (speeded-up robust features), MSER (maximal stable extreme regions), BRISK (binary robust invariant scalable keypoints) and/or other algorithms. The algorithm to be used in each case can be selected on the basis of the data record to be compared in order to use the algorithm which thus results in the greatest accuracy for the damage type in question. For example, the SURF algorithm may be used for matching the further image against a first damage type and the BRISK algorithm for matching the further image against a second damage type in the damage database. By providing the feature detection and matching method, the accuracy of determination of the type of damage can be increased. In addition, the further image can be compared with images of damage from other applications that are stored in the damage database, since the feature detection and matching method is not rotation- and scaling-invariant. For example, image sections of a damage that come from the literature and other applications may also be used.

The method may further comprise determining at least one region of interest in the further image and/or at least one region of interest in the image data of the damage database. The regions of interest are characterized by identical or divergent image data content. The particular regions of interest can be examined first, preferably and/or with other feature detection and matching methods. If, for example, a plurality of components is depicted in the further image and/or in data in the damage database, a component-specific damage comparison can be carried out by determining the regions of interest. For example, if a gear and a housing are depicted in the further image, by determining the regions of interest the housing can be matched only against housing damage data and the gear only against gear damage data in the damage database. The result is an increase in efficiency and a determination of the type of damage with great accuracy.

Moreover, the above-described industrial image-processing method, which is a non-learnable method of image processing, may be embedded in a machine learning method. The machine learning method may be, for example, a neural network, a support vector machine, a convolutional neural network (CNN) and/or some other machine learning method. The machine learning method can be trained in particular by the above-described industrial image-processing method to detect damage to a component. To this end, the method may include examining the type of damage output by the industrial image-processing method as well as a possibly required correction by a user of the damage type output. The user may be an expert who manually checks the output type of damage. The method may further include storing the correction in order to train the machine learning method. As a result of checking and correction by the user, the machine learning method can learn new links between the captured image material and the damage database and thereby increase the accuracy of damage detection.

Furthermore, it is possible for feedback to the further operation of the component to be automatically initiated in case of a detected damage and/or a specific type of damage. For example, when a damage and/or a certain type of damage to the component is detected, the output and/or rpm of the system may be reduced or the system may be completely switched off.

In addition, the present disclosure relates to a device for detecting damage to a component. The device comprises a first interface for providing a first image of a portion of the component in a reference state and a second interface for providing a further image of the portion of the component after its intended use. The device further comprises a third interface for providing a damage database with data of different instances of damage and a fourth interface for outputting a specific type of damage. The interfaces may be an input/output device, which may be designed, for example, for sending and receiving data streams in packetized or unpacketized form. The interfaces may be designed as separate devices. Alternatively, some or all of the interfaces may be implemented also via a single device, for example a bus. With regard to the understanding of the other features, reference is made to the above explanations in connection with the method.

In addition, the device comprises a computer system configured to compare the first image with the further image to determine based on the comparison whether the component is damaged. The computer system may have various computer units which may be arranged at different locations. Alternatively, the computer system may also have only a single computer unit. If damage to the component is detected, the computer system of the device is further configured to compare the further image with the data in the damage database in order to determine the type of damage and to output the determined type of damage via the fourth interface. Configuration of the computer system for a specific function is understood to mean a specific programming thereof for the corresponding function.

The device may further include a reference memory for storing the first image of the portion of the component, an image memory for storing the further image of the portion of the component after its intended use, and a database memory for storing the damage database. The reference memory may be connected to the first interface, the image memory to the second interface, and the database memory to the third interface. The various memories of the device may be provided on a single memory component or on various memory components that are locally separated from each other. The memories may be electronic memories.

Furthermore, the device may include an object detection unit for detecting the further image of the portion of the component after its intended use. The computer system may be configured to store in the image memory the further image detected with the object detection unit. The object detection unit may be portable or locally fixed.

The first image and the further image may be taken with the object detection unit with the same relative positioning relative to the portion of the component. This embodiment has the advantage that the two images can be compared with high accuracy and efficiency because they depict the portion of the component with the same scaling and perspective. Sometimes, however, the images can also be taken from different perspectives.

The object detection unit may be an imaging camera. The object detection unit may be embodied, for example, as a photographic apparatus with which a single image or a short series of individual images can be taken. Alternatively or additionally, the imaging camera may also be embodied as a motion-picture camera, such as a video camera, for capturing a continuous image sequence. As an alternative to the above-mentioned embodiments of the object detection unit, other imaging sensors for detecting electromagnetic waves are also conceivable, for example sensors for detecting radio waves, microwaves, radar, UV light, IR light, visible light and/or gamma radiation.

The computer system may have a comparator for comparing the first image with the further image and a separate matching unit for matching the further image against the data of the damage database. The matching unit of this embodiment is provided separately, i.e. as an independent unit separate from the comparator. The two units can nevertheless be networked with one another.

In addition, the reference memory, the image memory and the comparator may be provided in the object detection unit. This enables the further image to be compared with the image in the reference state at the location of the component. A network for data transmission is thus not required for the comparison, which in turn results in a particularly fast comparison operation.

The device may further comprise a server and a network via which the object detection unit and the server can communicate with one another. The server may be a computer capable of communicating with various clients, such as object detection units. The various object detection units can each be configured to detect damage to a component, for example according to an embodiment. The server may be a central unit and may include or provide, for example, an ECU and/or a cloud service. The server may be arranged locally separate from the object detection units, for example outside the call, hearing, and/or voice ranges. The network may be a wireless and/or wired network. For example, the object detection units and the server may communicate with each other via a global area network (GAN) such as the internet. Alternatively or additionally, communication between object detection units and servers is also conceivable via a LAN, WLAN, Bluetooth or the like.

Furthermore, the database memory and the matching unit may be provided on the server. This makes it possible to provide the damage database centrally on a server for a plurality of clients, for example object detection units. Central maintenance of the damage database is thus also made possible. Likewise, a possibly complex matching operation can thus be carried out by a central, powerful computer for a plurality of clients.

The device may include a user interface for maintenance of the damage database on the database memory by a user. (Data) maintenance means, in particular, that data of the damage database is updated, supplemented and optimized or that unusable data records are deleted. For example, new damage images can be added to the database via the user interface. This can be done via a software module or a programming interface, for example a web service and/or client SW. Furthermore, a function may be provided in the user interface that reports back to the user which images/ image properties (for example, size, resolution, brightness and the like) have led to successful identification of a damage, in particular specifically according to the type of defect. The quality of the image data in the damage database can thus be increased. In addition, an automated expansion is provided, which, for example, images from the operation of the method that have been confirmed by the expert or due to the method lie above a certain confidence level, are automatically entered into the damage database.

Furthermore, the present disclosure relates to a transmission having a component and a device according to one of the previously described embodiments, which is configured to detect damage to the component. The transmission may be a transmission of a wind turbine.

The following is a description of one embodiment of the present invention with reference to the drawings.

FIG. 1 shows an embodiment of a device 1 for detecting damage to a component 10. The system 1 includes a photographic camera 2 and a server 6. Camera 2 and server 6 are connected to each other via a network 7 in such a way that communication between camera 2 and server 6 is enabled. In the present embodiment, the network 7 is the internet.

The device 1 of the present embodiment further comprises a component 10. In the present embodiment, the component 10 is a transmission, more precisely a spur gear of a wind turbine.

The camera 2 of the device 1 is arranged in such a way that it can detect a portion of the component 10 from which damage to the component 10 can be seen. Furthermore, embodiments are conceivable in which the camera 2 is arranged movably, in particular pivotably, whereby different components 10 or different portions of a component 10 can be detected with only one camera 2. In a further embodiment, the camera 2 may include a cleaning device to remove contaminants due to lubricants and abrasion, so that a high-quality image can be taken.

The camera 2 has a reference memory 3 for storing a first image 14.0 of a portion of the component 10 in a reference state. Furthermore, the camera 2 comprises an image memory 4 for storing a further image 14.1, 14.2, 14.3 of the portion of the component 10 after intended use. Furthermore, the camera 2 comprises a comparator 5 with which the image in the reference state 14.0 can be compared with the further image 14.1, 14.2, 14.3 by means of a correlation analysis and it can be determined whether the component 10 is damaged. The comparator 5 is a correspondingly programmed control unit or ECU which has a microcontroller.

Furthermore, the device 1 comprises a database memory 8 for storing a damage database with image data of various damages. The device 1 also comprises a matching unit 9 configured to compare the further image 14.1, 14.2, 14.3 with the image data in the database memory 8 when a damage is detected by the comparator 5 in order to determine damage type and damage severity.

The device further comprises a user interface 11 for maintaining the damage database. As regards the formation of this user interface 11 and of the damage database, reference is made to the above explanations.

The reference memory 3, the image memory 4 and the comparator 5 are provided in the camera 2 in this embodiment. The database memory 8, the matching unit 9 and the user interface 11 are provided in the server 6. However, the present embodiment is not limited to such a configuration. Alternatively, it is likewise possible for the reference memory 3, image memory 4, comparator 5, database memory 8, matching unit 9 and user interface 11 to be provided in the camera 2. Any other allocation of the individual components to camera 2 and server 6 is also conceivable. In addition, it is possible for individual components to be provided redundantly, in particular on both the camera 2 and the server 6. For example, the reference memory 3 and the image memory 4 may be provided on the camera 2 and a further reference memory and a further image memory may be provided on the server 6. This makes sense for archiving purposes, for example.

Figure 2:
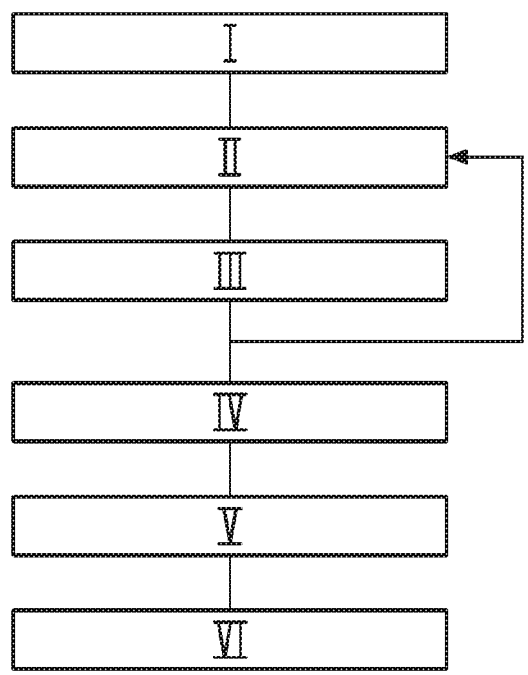
FIG. 2 shows a flowchart for describing a method for detecting damage to a component according to an embodiment.

Hereinafter, the process flow of a method for detecting damage to a component 10 according to an embodiment is described based on the flowchart shown in FIG. 2. The embodiment of the method described below is described with reference to the system 1 shown in FIG. 1. However, the method according to the present embodiment may be performed on other systems as well.

In a first step I of the method of the present embodiment, the camera 2 takes first images 14.0 of the component 10 in different operating positions in a reference state. The recorded images are stored with the pertinent operating position of the component 10 in the reference memory 3 which is shown in FIG. 1. Alternatively or additionally, it is conceivable that the images of the component 10 in the reference state are not recorded by the camera 2 but are made available by the manufacturer of the component 10 or in some other way on the reference memory 3.

In a second step II, the camera 2 takes a further image 14.1, 14.2, 14.3 of the component 10 at a specific operating position after its intended use and stores it in the image memory 4.

In a subsequent step III, the further image 14.1, 14.2, 14.3 of the component 10 is compared by the comparator 5 with that one of the first images 14.0 in the reference state that was taken at the same operating position. In this embodiment, the comparison takes place by means of illumination-normalized correlation analysis of the gray and/or color values.

Figure 3:
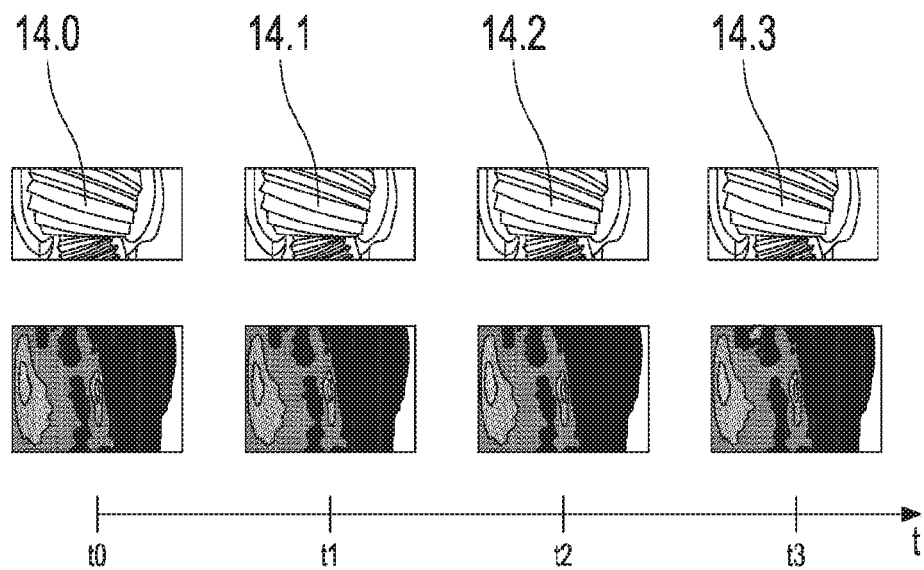
FIG. 3 shows examples of the results of a correlation analysis performed within the scope of the embodiment depicted in FIG. 2.

FIG. 3 shows such a comparison of the first image 14.0 of the component 10 at a specific position in the reference state, which was taken at a time t0, with further images 14.1, 14.2, 14.3 of the component 10 at the same position which were taken after the intended use of the component 10 at points in time t1, t2 and t3. If the correlation between the images is below a threshold value, it will be determined that the component 10 is damaged. For example, damage may be established if the correlation is below 99.9%, 95%, 90% or 82%.

The images are congruent at time t0 so that the correlation is 100%. As time progresses, the correlation between the first and the further images 14.1, 14.2, 14.3 decreases. The correlation between the further image 14.3 taken at time t3 and the reference image 14.0 is thus lower than that between the reference image 14.0 and the further image 14.1 that was taken at time t1. This is due to the fact that, in the example shown, the degree of component damage increases as time progresses, which is reflected in the differences in the images to be compared. These greater deviations, in turn, result in a lower correlation of the images.

If damage to the component 10 is detected in step III by comparing the further image 14.1, 14.2, 14.3 with an image 14.0 in the reference state, the further image 14.1, 14.2, 14.3 in image memory 4 will in a subsequent step IV be matched by matching unit 9 against data of the previously described damage database in the database memory 8. The comparison serves to determine the type of damage. If no damage to the component 10 is detected in comparison step III, then steps II and III will be carried out again at a later point in time until damage is detected.

Figure 4:
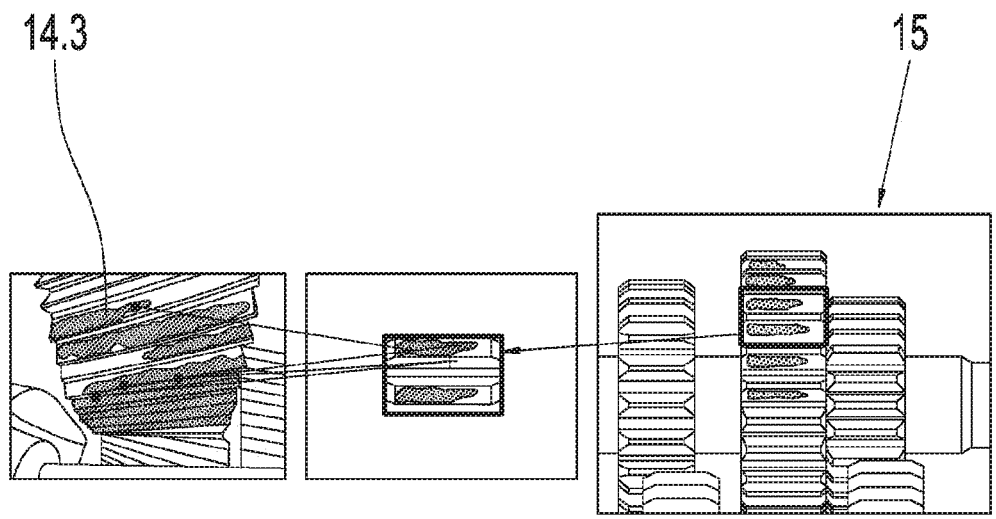
FIG. 4 shows an example of a result of feature detection and matching analysis performed within the scope of the embodiment depicted in FIG. 2.

In this embodiment, the matching step IV for determining the type of damage takes place with a feature detection and matching analysis between the image in the image memory 4 and the image data in the damage database in the database memory 8. FIG. 4 shows, by way of example, the result of a feature detection and matching analysis of a further image 14.3 in the image memory 4 with a damage image 15 from another application. In the present case, this is, for example, due to the fact that the damage image 15 from another application shows a gear arrangement with straight toothing, while the further image 14.3 shows a gear with helical toothing.

Furthermore, before applying the feature detection and matching analysis, a correlation between the further image 14.1, 14.2, 14.3 and the image data in the damage database is carried out within the scope of the matching step IV in the present embodiment. In this case, depending on the threshold value, first the damage types matching or most common to this deviation are checked for correlation in order to provide in this way a calculation-efficient and thus time and cost-efficient matching. A component-specific search for damage in the image data of the damage database also contributes to this, since it is known and documented where which component is depicted in the individual image data. A further preselection can thus be made as to which image data in the damage database are to be compared with the further image 14.1, 14.2, 14.3 by means of the feature detection and matching analysis.

In a step V of the method of the present embodiment, the determined damage type is output. In addition to the damage type and damage severity, the output also includes metadata such as the position of the damage and the time at which the damage occurred. As an alternative or in addition, feedback to the operation of the component 10 may be automatically initiated based on the output.

According to the present embodiment, the matching unit 9 is further configured to execute a machine learning method (ML) in addition to the industrial image-processing method (IB method) described in connection with FIGS. 2 to 4.

Figure 5:
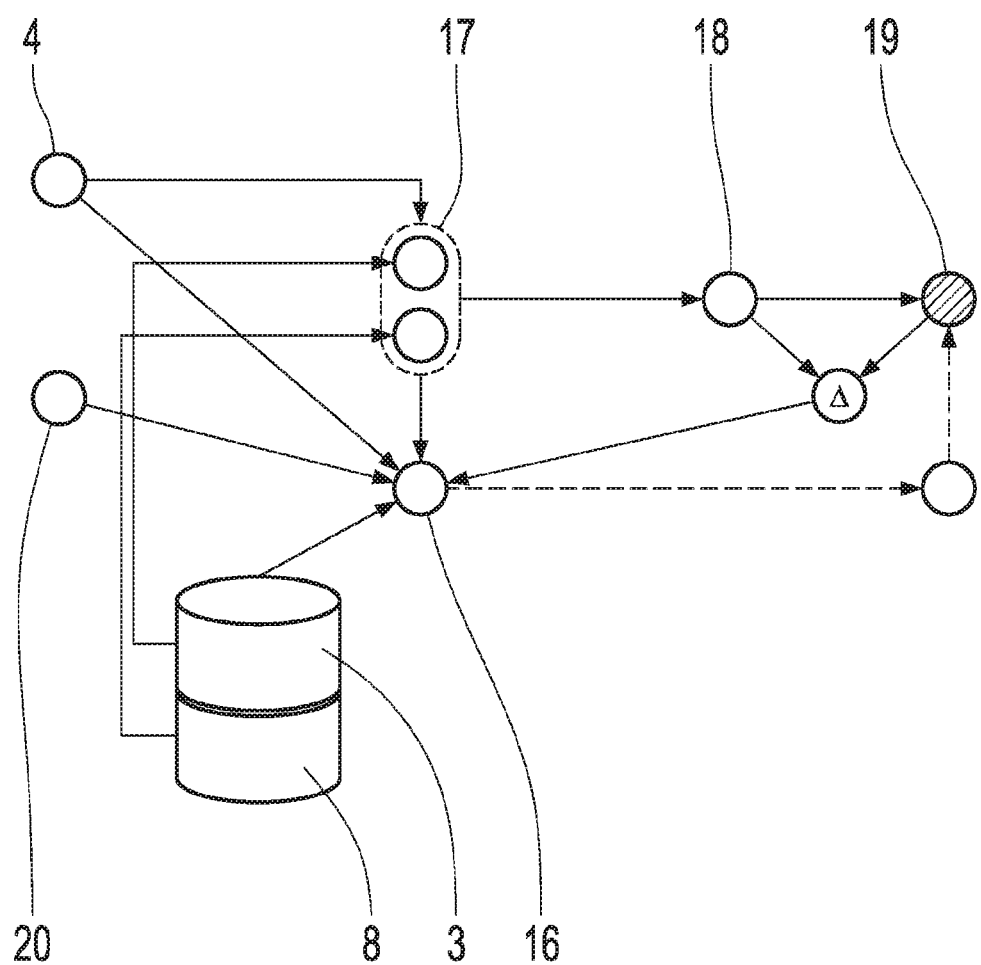
FIG. 5 shows a block diagram of a machine learning method according to an embodiment that can be trained by the method shown in FIG. 2.

As shown in FIG. 5, in the present embodiment the ML method 16 is trained by the IB method 17. The IB method 16 is the one previously described in connection with FIGS. 2 to 4, where in order to determine the type of damage the further image 14.1, 14.2, 14.3 in the image memory 4 is compared with the reference image in the reference memory 3 and matched against the image data in the database memory 8.

In an optional step VI, the method of the present embodiment further comprises an expert 19 checking the type of damage 18 output by the IB method 17 together with the previously described metadata 20. From the outputs of the IB method 18 confirmed and discarded by the expert 19, the ML method 16 can learn new links between the images taken in the application and the damage database.

This may include a product-specific and/or application-specific and/or overall exchange of the training results of the machine learning method, for example according to error mechanisms.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 System for detecting damage to a component
2 Camera
3 Reference memory
4 Image memory
5 Comparator
6 Server
7 Network
8 Database storage
9 Matching unit
10 Component
11 User interface
14.0 Image of component in the reference state
14.1 . . . 14.3 Image of component after intended use
15 Damage image made by other application
16 ML method
17 IB method
18 Damage type output
19 Expert
20 Metadata
I Provision of image of component in the reference state
II Detection of image of component after intended use
III Comparison of image in the reference state with image after intended use in order to determine a damage
IV Matching of image after intended use against data from the damage database in order to determine the type of damage
V Outputting of the damage type
VI Examination and correction of the damage type output

The invention claimed is:

1. A method for detecting damage and determining a type of damage and a degree or severity of damage to a component of a transmission, the method comprising:
    providing, to a device of a transmission via a first interface of the device, a first image of a portion of the component in a reference state;
    detecting, via an object detector of the transmission, a further image of the portion of the component after intended use, the further image of the portion of the component being detected in an installed state of the component;
    comparing, by a computer system of the device of the transmission in a first stage, the further image with the first image to determine a damage state of the component, the damage state being either damaged or not damaged; and
    when the damage state is determined to be damaged, comparing, by the computer system of the device of the transmission in a second stage, the further image with data of a damage database to determine a type of damage and outputting, by a fourth interface of the device of the transmission, a determined type of damage of the component and a degree of severity,
    wherein the first image, the further image, and the data of the damage database are photographs,
    wherein the further image of the portion of the component is provided to the device of the transmission via a second interface of the device,
    wherein the further image of the portion of the component is stored in an image memory connected to the second interface,
    wherein the data of the damage database is accessed by the computer system of the transmission via a third interface, and
    wherein the damage database includes data of different damages.

2. The method according to claim 1, wherein the comparing of the further image with the first image is performed via a correlation analysis.

3. The method according to claim 1, wherein the matching the further image against the data in the damage database comprises a feature detection and matching method.

4. The method according to claim 3, wherein the method further comprises:
   determining at least one region of interest in the further image and at least one region of interest in the image data in the damage database; and
   matching the determined regions of interest by the feature detection and matching method.

5. The method according to claim 1, wherein the matching of the further image against the data in the damage database is embedded in a machine learning method, the method further comprising:
   examining and correcting, by a user, the damage type output; and
   storing the correction in order to train the machine learning method.

6. The method according to claim 1, wherein feedback to the further operation of the component is automatically initiated in case of a detected damage and/or a specific type of damage.

7. A transmission comprising:
   a component; and
   a device comprising:
      a first interface configured to provide a first image of a portion of the component in a reference state;
      wherein the device further comprises a second interface configured to provide a further image of the portion of the component in an installed state of the component after intended use;
      wherein the device further comprises a third interface configured to provide a damage database with data of different damages;
      wherein the device further comprises a fourth interface configured to output a determined damage type; and
      wherein the device further comprises a computer system configured to:
         compare the first image with the further image in order to determine, based on the comparison, that the component is damaged,
         to match the further image against the data in the damage database to determine the type of damage, and
         to output the determined type of damage via the fourth interface,
      a reference memory configured to store the first image of the portion of the component, the reference memory being connected to the first interface;
      an image memory configured to store the further image of the portion of the component after intended use, the image memory being connected to the second interface; and
      a database memory configured to store the damage database, which is connected to the third interface;
      an object detector configured to detect the further image of the portion of the component after intended use,
      wherein the computer system is configured to store, in the image memory, the further image detected with the object detector;
      wherein the first image, the further image, and the data of the damage database are photographs,
      wherein the object detector is an imaging camera;
      wherein the device is configured to detect damage and determine a type of damage to the component.

8. The transmission according to claim 7, wherein the computer system comprises a comparator configured to compare the first image with the further image and a separate matching unit configured to match the further image against the data in the damage database.

9. The transmission according to claim 7, wherein the reference memory, the image memory and a comparator are provided in the device.

10. The transmission according to claim 7, the device further comprising:
    a server; and
    a network configured to allow the object detection unit and the server to communicate with each other,
    wherein the database memory and the matching unit are provided on the server.

11. The method according to claim 1, wherein the comparing the further image with the data of the damage database to determine a type of damage includes:
    carrying out, using a first algorithm, a feature detection for matching the further image against a first damage type in the damage database, and
    carrying out, using a second algorithm, a second feature detection for matching the further image against a second damage type in the damage database.

12. The transmission according to claim 7, wherein the transmission is a transmission of a wind turbine.

13. A wind turbine, comprising the transmission according to claim 7.

* * * * *